United States Patent
Castillo

(10) Patent No.: US 7,509,182 B2
(45) Date of Patent: Mar. 24, 2009

(54) PROVIDING MULTIPLE AUDIO STREAMS TO AN AUDIO DEVICE AS A SINGLE INPUT

(75) Inventor: Mike J. Castillo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 11/011,562

(22) Filed: Dec. 14, 2004

(65) Prior Publication Data

US 2006/0129255 A1    Jun. 15, 2006

(51) Int. Cl.
  *G06F 17/00* (2006.01)
(52) U.S. Cl. .......................................... 700/94; 381/77
(58) Field of Classification Search ................... 700/94; 381/77

See application file for complete search history.

(56) References Cited

U.S. PATENT DOCUMENTS

| | | | |
|---|---|---|---|
| 6,185,305 B1 * | 2/2001 | Reinold et al. ................. | 700/94 |
| 6,788,352 B2 * | 9/2004 | Kim ............................. | 348/553 |
| 7,236,599 B1 * | 6/2007 | Shi et al. ....................... | 700/94 |
| 2003/0204276 A1 * | 10/2003 | Ziep et al. ..................... | 700/94 |
| 2004/0117044 A1 * | 6/2004 | Konetski ....................... | 700/94 |

* cited by examiner

*Primary Examiner*—Walter F Briney, III
(74) *Attorney, Agent, or Firm*—Buckley, Maschoff & Talwalkar LLC

(57) ABSTRACT

According to some embodiments, a first audio stream associated with a first image stream and a second audio stream associated with a second image are determined. The first and second audio streams may each have, for example, at least two channels. The first and second audio streams may then be provided to an audio device as a single input stream, the audio device being adapted to receive a single audio input stream having at least four channels.

22 Claims, 8 Drawing Sheets

PROVIDING MULTIPLE AUDIO STREAMS TO AN AUDIO DEVICE AS A SINGLE INPUT

BACKGROUND

A media device can provide image and audio information to a display device. For example, a media device might retrieve locally stored media information or receive a stream of media information from a media server (e.g., a content provider might transmit a stream that includes multiple high-definition channels to a television, a set-top box, or a digital video recorder through a cable or satellite network). The media device may then decode the received media information and generate image and audio signals to be provided to a television. In some cases, it might be desirable to have a single media device provide different image and audio signals to different display devices at the same time. For example, a media device might let someone watch a program on one television and at the same time let another person watch a different program on another television (e.g., in a different room).

DETAILED DESCRIPTION

Figure 1:
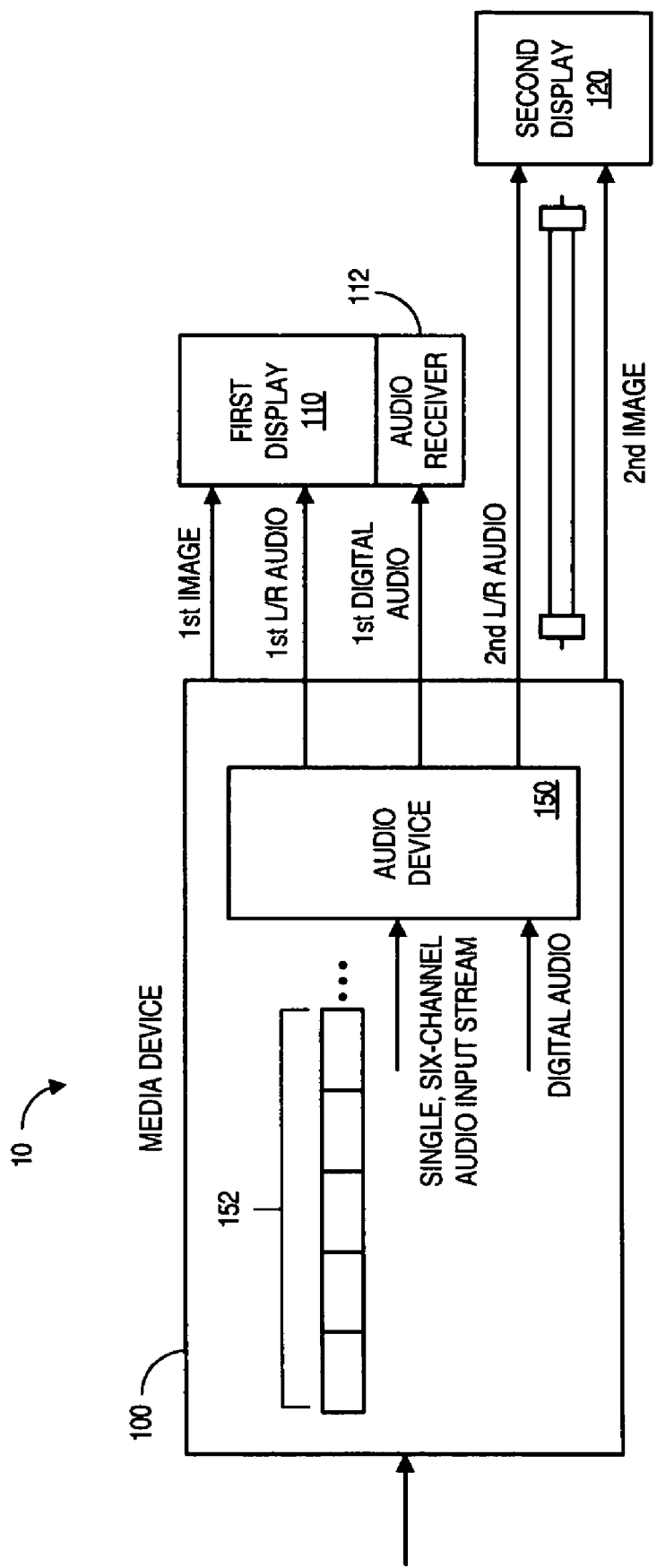
FIG. 1 is a block diagram of a media system according to some embodiments.

FIG. 1 is a block diagram of a media system 10 that includes a media device 100. As used herein, the phrase "media device" may refer to any device that provides image and audio information to a display device. Examples of media devices include a set-top box (e.g., to receive a stream of media information from a cable or satellite content provider), a Digital Video Recorders (DVR), a Personal Computers (PC), a game device, and a media tuner or decoder.

The media device 100 may determine media information, for example, by receiving a stream of media information from a network or by retrieving locally stored information. Note that media information may be processed in accordance with any of a number of different protocols. For example, media information may be processed in accordance with International Telecommunication Union-Telecommunications Standardization Sector (ITU-T) recommendation H.264 entitled "Advanced Video Coding for Generic Audiovisual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000).

The media device 100 may determine image information associated with a first image stream and provide the image signals to a first display 110. For example, the media device 100 might provide a High Definition Television (HDTV) signal to the first display 110. The media device 100 may also determine a first audio stream associated with the first image stream and provide two channels of audio information to the first display 110. For example, the media device 100 might provide left and right speaker signals associated with the first image stream to the first display 110.

In some cases, the media device 100 may also provide a digital audio signal associated with the first image stream to an audio receiver 112 associated with the first display 110. The digital audio signal might include, for example, SONY®/PHILIPS® Digital Interface Format (S/PDIF) information as defined by the European Broadcast Union (EBU) standard number IEC958 entitled "Digital Audio Interface (Consumer Part)" (1989). Such a digital audio signal might be used, for example, to provide 5.1 multi-channel and/or DOLBY® DIGITAL sound to a viewer. In the case of 5.1 multi-channel sound, the audio receiver 112 might provide left and right audio information, left and right rear audio information, center audio information, and Low Frequency Effects (LFE) audio information to a viewer.

In some cases, it may be desirable to have a media device 100 provide different image and audio information to different displays at the same time. For example, the media device 100 might provide HDTV image and digital audio information associated with a first image stream (e.g., a first television program) to a co-located television while simultaneously providing regular National Television Systems Committee (NTSC) image and left and right audio information associated with a second image stream (e.g., a second television program) to a second display 120 located in another room. The NTSC image and audio information might be provided to the second display 120 via, for example, a standard RG-6 cable.

To support multiple displays, the media device 100 may include multiple tuners and/or decoders. Moreover, multiple audio devices could be used to generate the appropriate audio information. The use of multiple audio devices, however, might increase the cost of the media device 100. According to some embodiments, a single audio device 150 is used to provide audio information associated with both displays 110, 120.

The audio device 150 may, for example, support audio signal processing in accordance with the INTEL® standard entitled "Audio CODEC '97 (Revision 2.2)" (2000). In this case, the audio device 150 may be adapted to receive a single, six-channel audio input and a digital audio stream (e.g., an S/PDIF stream) via an Audio CODEC (AC)-link.

Figure 2:
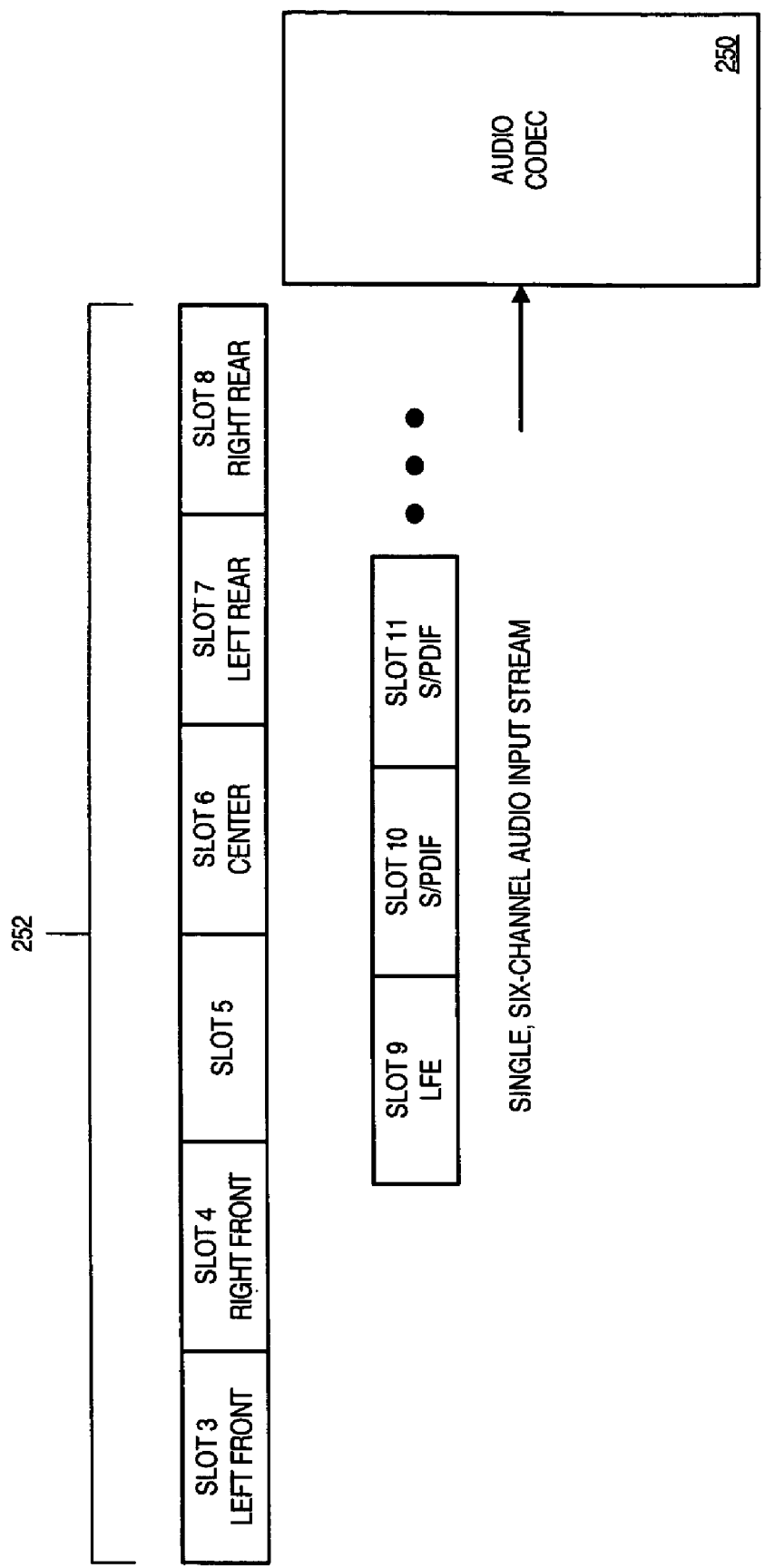
FIG. 2 illustrates a single, multi-channel audio input stream being provided to an audio device.

For example, FIG. 2 illustrates a single, multi-channel audio input stream 252 being provided to an audio device 250 via an AC-link that allocates audio information using Time Division Multiplexing (TDM) "slots." In particular, the audio device 250 receives left and right front audio information in slots 3 and 4, center audio information in slot 6, left and right rear audio information in slots 7 and 8, LFE audio information in slot 9, and S/PDIF audio information in slots 10 and 11.

Figure 3:
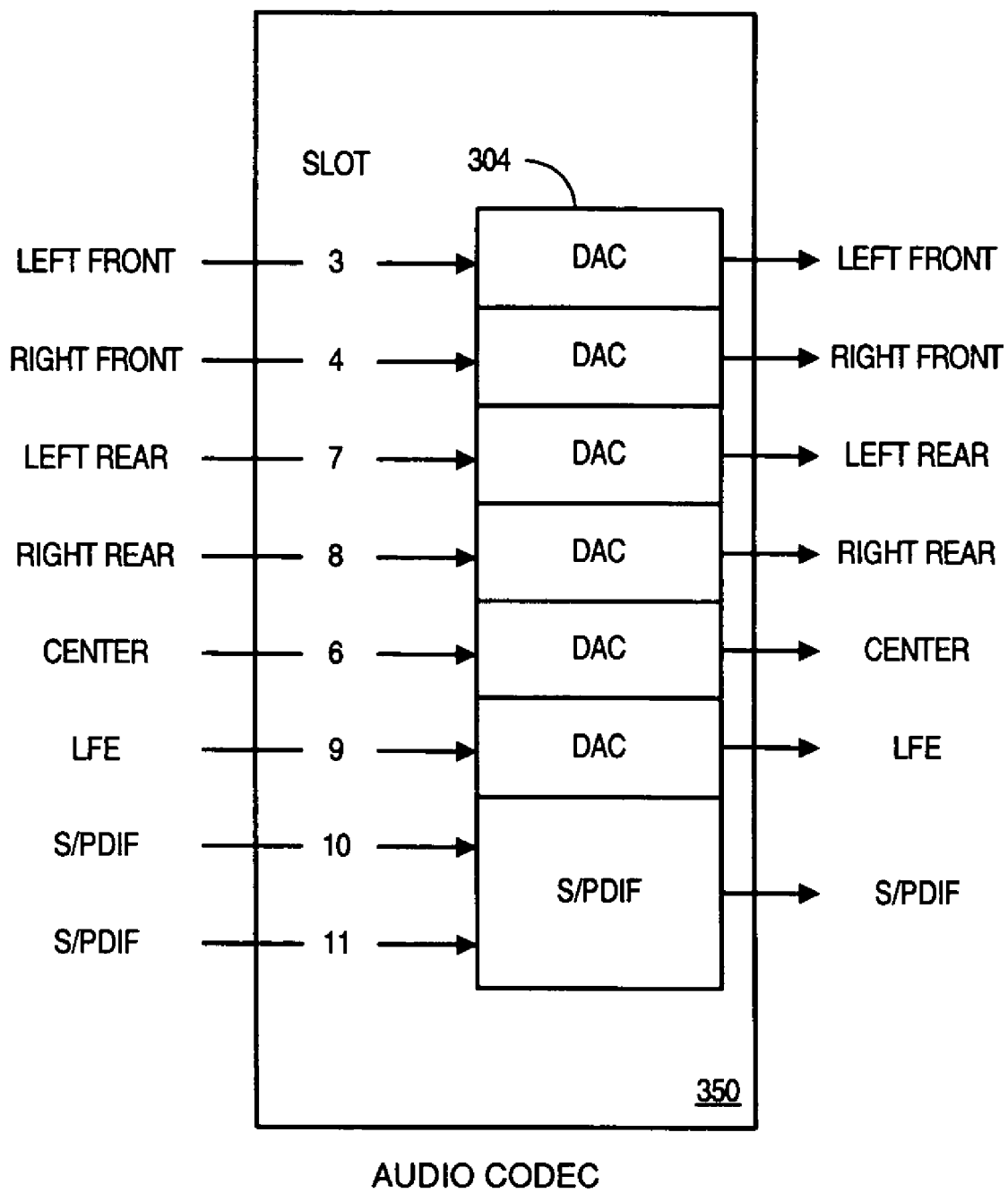
FIG. 3 illustrates slot assignments for an audio device.

FIG. 3 illustrates how an audio CODEC 350 may use a number of Digital-to-Analog Converters (DACs) 304 to generate appropriate signals representing analog audio information using Pulse Code Modulation (PCM). In this way, the audio CODEC 350 can convert the single, six-channel audio input (slots 3-4 and 6-9) into six separate outputs (left and right front, left and right rear, center, and LFE). The audio CODEC 350 also converts the two-slot S/PDIF input (slots 10 and 11) into an S/PDIF digital audio output.

Figure 4:
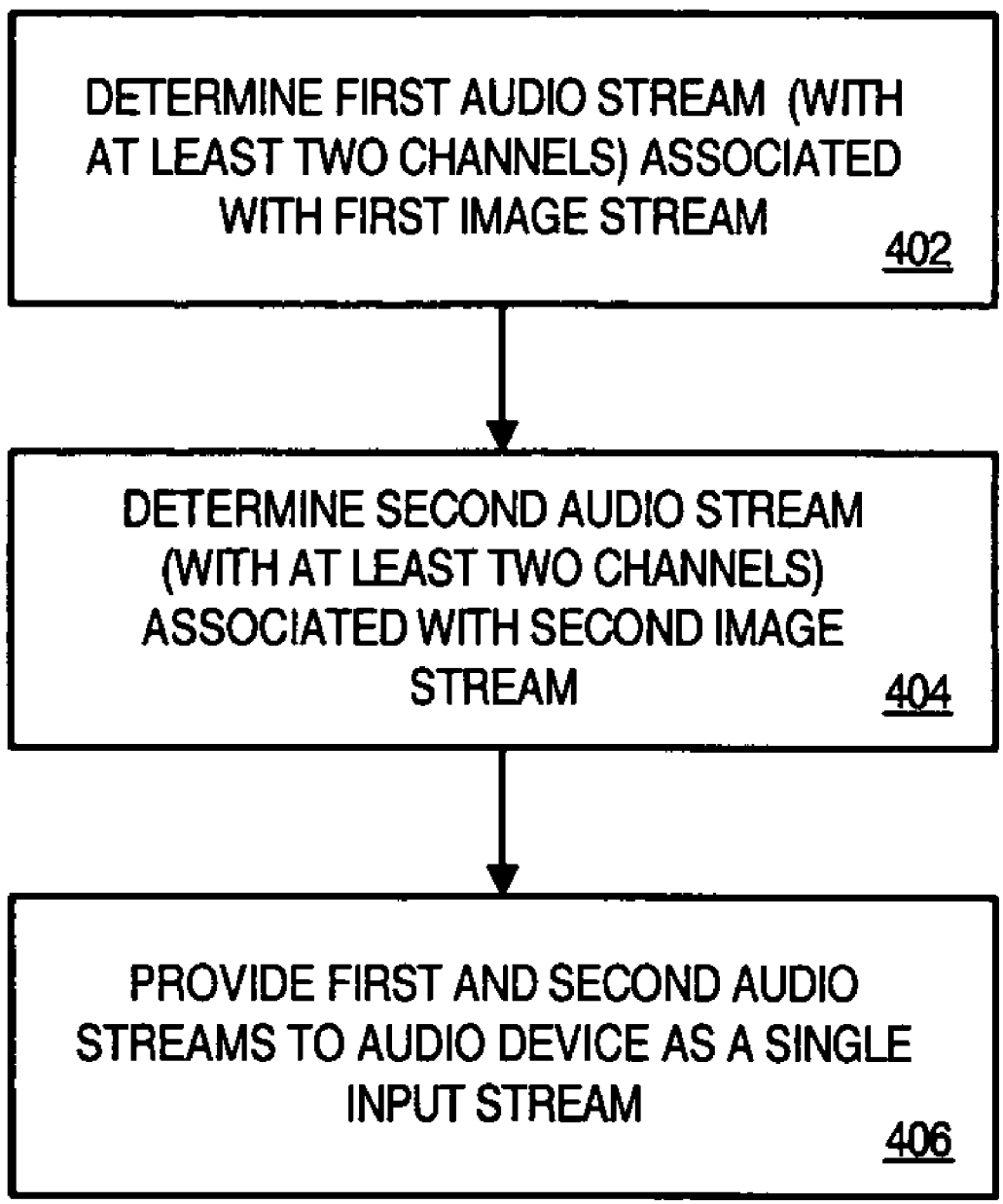
FIG. 4 is a flow diagram illustrating a method according to some embodiments.

FIG. 4 is a flow diagram illustrating a method according to some embodiments. The method may be performed, for example, by the media device 100 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 402, a first audio stream associated with a first image stream is determined, the first audio stream having at least two channels. Similarly, a second audio stream associated with a second image stream is determined at 404, the second audio stream also having at least two channels. The first and second audio streams might each include, for example, left and right channels associated with different television programs.

At 406, the first and second audio streams are provided to an audio device as a single input stream, the audio device being adapted to receive a single audio input stream having at least four channels. For example, the audio device might be adapted to receive: (i) a left front channel, (ii) a right front channel, (iii) a left rear channel, and (iv) a right rear channel. In this case, the left channel associated with the first image stream may be mapped to the left front channel of the input stream while the right channel is mapped to the right front channel. Similarly, the left channel associated with the second image stream may be mapped to the left rear channel of the input stream while the right channel is mapped to the right rear channel.

Figure 5:
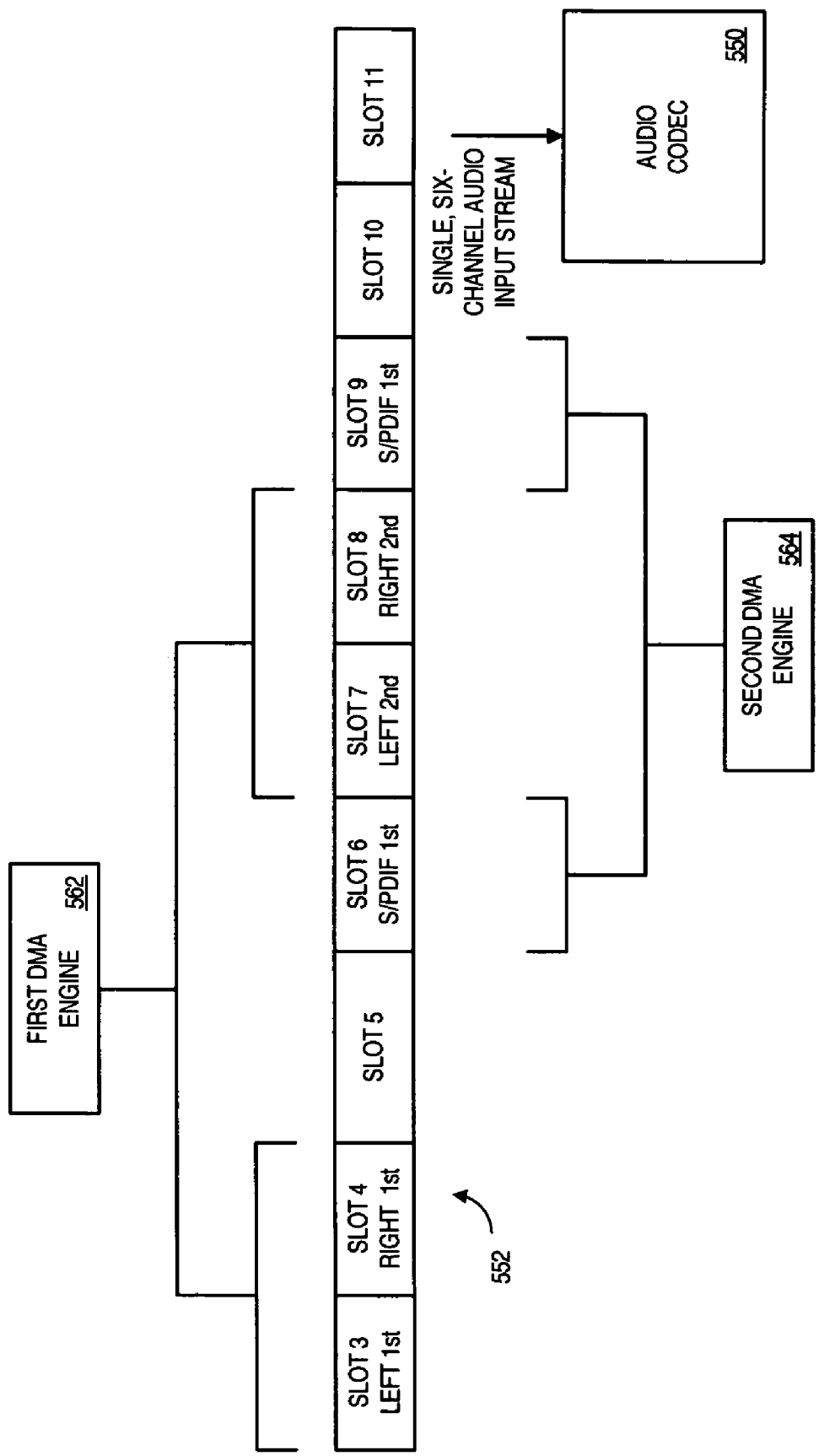
FIG. 5 illustrates a single, multi-channel audio input stream being provided to an audio device according to some embodiments.

For example, FIG. 5 illustrates a single, multi-channel audio input stream 552 being provided to an audio device 550 via an AC-link. According to this embodiment, the audio device 550 receives left and right audio information associated with a first image stream in slots 3 and 4 (which are adapted to provide left and right front audio information) and left and right audio information associated with a second image stream in slots 7 and 8 (which are adapted to provide left and right rear audio information). Moreover, S/PDIF digital audio information associated with the first image stream is provided in slots 6 and 9 (as opposed to slots 10 and 11 in accordance with AC97). According to some embodiments, the transfer of both two-channel audio streams over the AC-link is facilitated by a first Direct Memory Access (DMA) engine 562 while the transfer of the S/PDIF information is facilitated by a second DMA engine 564. For example, the first DMA engine 562 might support 6-channel, 20-bit playback using six slots (e.g., for surround-sound) while the second DMA engine 564 supports 2-channel, 16-bit playback using two slots (e.g., for S/PDIF information).

Figure 6:
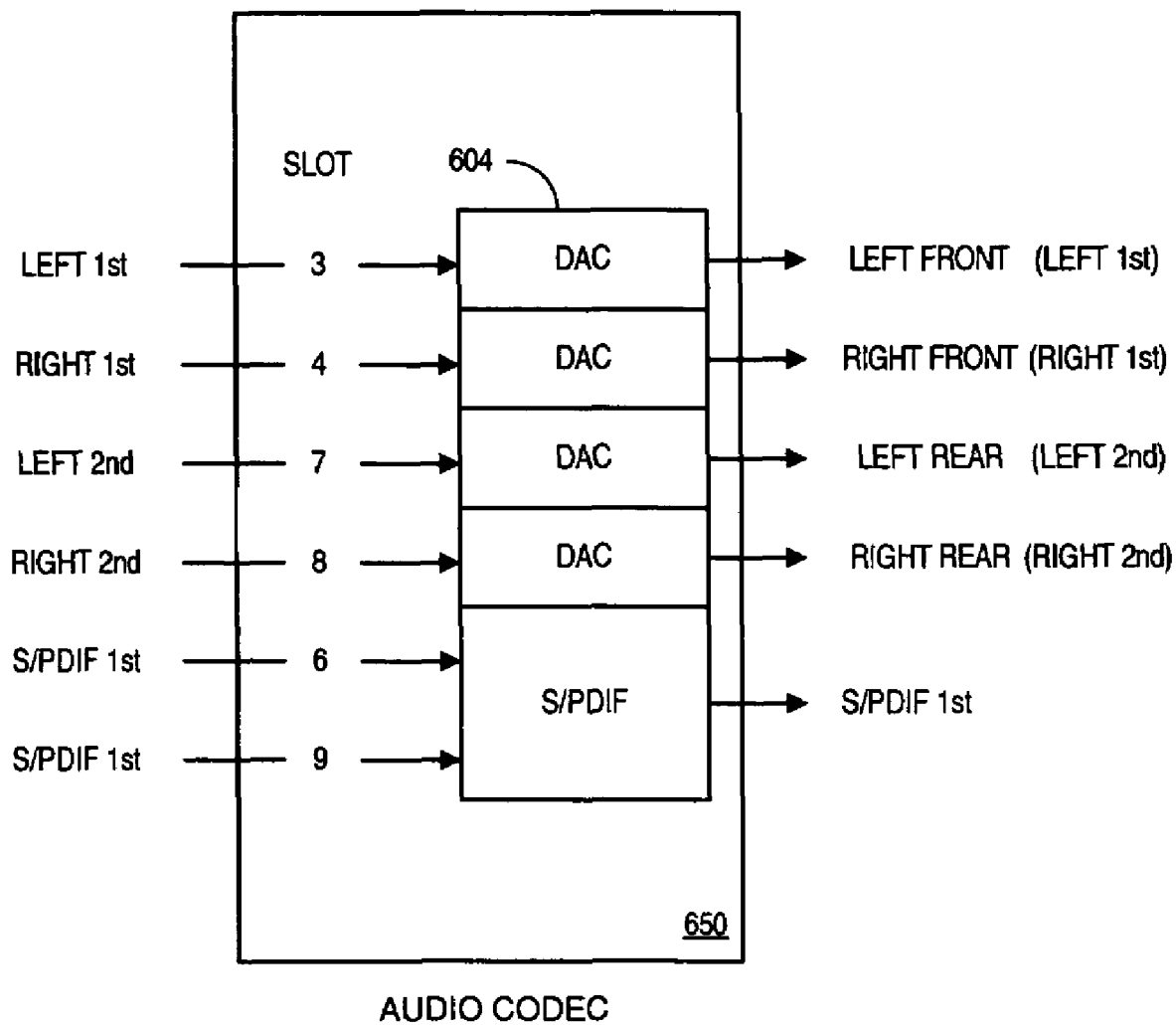
FIG. 6 illustrates slot assignments for an audio device according to some embodiments.

FIG. 6 illustrates how an audio CODEC 650 may use DACs 604 to generate appropriate signals representing analog audio information. Note that the audio CODEC 650 converts a single, multi-channel audio input (slots 3-4 and 7-8) into four separate outputs. In particular, the DACs 604 which are adapted to support the left and right front audio channels are used instead to provide the left and right audio information associated with the first image stream, while the DACs 604 adapted to support the left and right rear audio channels are used instead to provide the left and right audio information associated with the second image stream. Thus, a single audio device 650 may support multiple displays, and the costs associated with a media device may be reduced.

Figure 7:
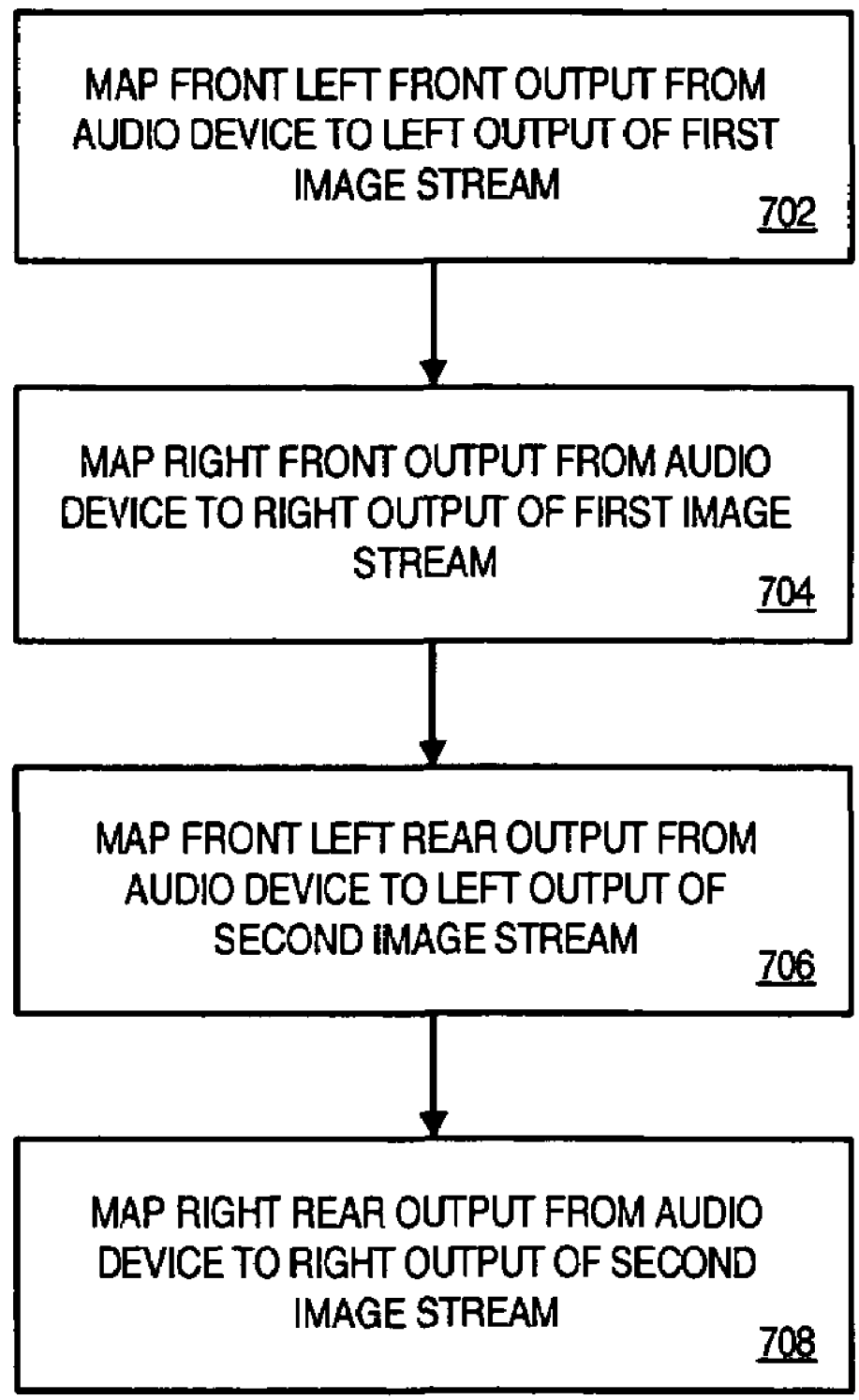
FIG. 7 is a flow diagram illustrating a method according to some embodiments.

FIG. 7 is a flow diagram illustrating a method according to some embodiments. The method may be used, for example, to provide an output from a single audio CODEC to multiple display devices. At 702, a left front output from the audio device is mapped to a left output associated with a first image stream, and a right front output from the audio device is mapped to a right output at 704. At 706, a left rear output from the audio device is mapped to a left output associated with a second image stream, and a right front output from the audio device is mapped to a right output at 708. Thus, the single audio CODEC may provide left and right audio information for two different displays at the same time.

Figure 8:
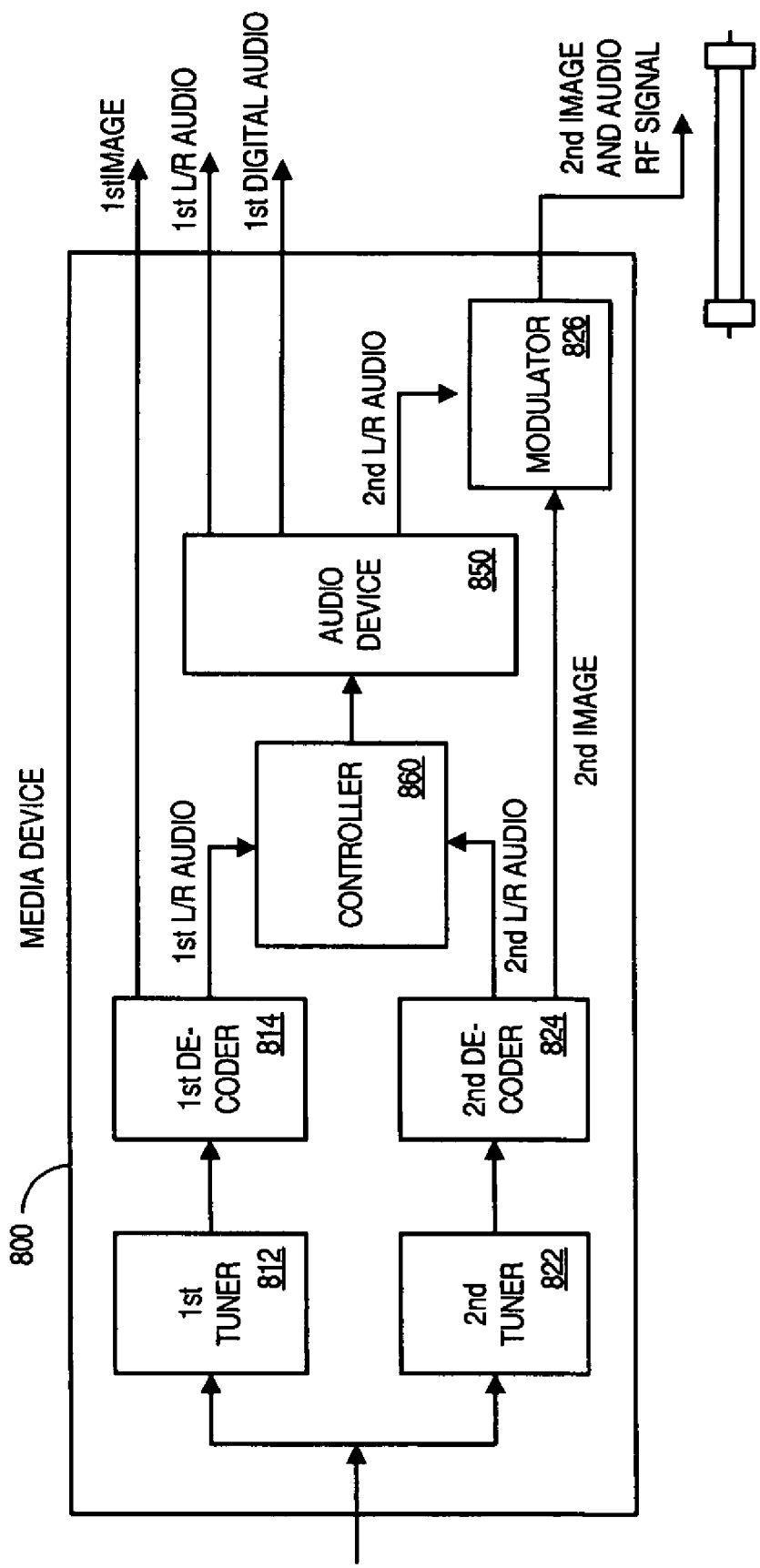
FIG. 8 is a block diagram of a media device according to some embodiments.

FIG. 8 is a block diagram of a media device 800 according to some embodiments. The media device 800 may receive media information (e.g., MPEG2 information) at a first tuner 812 that extracts a first Transport Stream (TS) associated with a particular channel or program. A first decoder 814 may then generate first image information to be provided to a first display device (not shown in FIG. 8). Likewise, a second tuner 822 may extract a second TS associated with another channel or program, and a second decoder 824 may generate second image information.

A controller 860 may receive from the first decoder 814 left and right audio information associated with the first image stream. The controller 860 may also receive from the second decoder 824 left and right audio information associated with the second image stream. The controller 860 may include or otherwise be associated with, for example, an INTEL® Pentium processor, a Graphics and Memory Controller Hub (GMCH), an Input/output Controller Hub (ICH), and/or DMA engines.

The controller 860 may arrange for both two-channel audio signals to be provided to an audio device 850 as a single, multi-channel audio input. The audio device 850 might be, for example, a SIGMATEL® STAC9756 audio CODEC. The controller 860 may also arrange for a digital input (e.g., S/PDIF) associated with the first image stream to be provided to the audio device 850.

The left and right front outputs from the audio device 850 may then be provided to a first display device (along with the digital audio signal) as an output that represents the right and left audio channels for the first image stream.

The left and right rear outputs from the audio device 850 may be provided to a modulator 826 that also receives the second image information from the second decoder 824. The modulator 826 may then use Radio Frequency (RF) modulation to generate an NTSC television signal to be transmitted to a remote second display device via a cable. Note that embodiments might be used to generate any other type of television signal, such as a Phase Alternation Line (PAL) signal. According to some embodiments, the remote display is supported via a wireless communication.

Depending on how the audio device 850 processes the multi-channel input, the controller 860 might adjust the left and right audio information associated with the second image stream before providing the information via an AC-link. For example, because these two channels will be processed as left and right rear audio information, the controller 860 might perform an equalization, a sample rate conversion, and/or an amplification of these signals.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although particular mappings have been described herein, embodiments may use any type of mapping. For example, the left channel associated with first image stream might be mapped to the left front while the right channel associated with the first image is mapped to the left rear (in which case, the two channels associated with second image stream might be mapped to the right front and right rear).

Moreover, although support of two display devices has been described herein, embodiments might support more displays. For example, a third display might be supported using an audio CODEC's center and LFE channels. As another approach, these two channels could instead be used to provide additional audio information for two display devices. For example, two three-channels sets of audio information might be provided as follows: (i) the left front, right front, and center for a first image streams and (ii) the left rear, right rear, and LFE for a second image stream.

The several embodiments described herein are solely for the purpose of illustration. Persons skilled in the art will recognize from this description other embodiments may be practiced with modifications and alterations limited only by the claims.

What is claimed is:

1. A method, comprising:
   determining a first audio stream associated with a first image stream, the first audio stream having at least two channels;
   determining a second audio stream associated with a second image stream, the second audio stream having at least two channels;
   providing the first and second audio streams to an audio device as a single input stream, the audio device being adapted to receive a single audio input stream having at least four channels; and
   providing a third audio stream associated with the first image stream to the audio device as a digital input stream.

2. The method of claim 1, wherein the first audio stream includes left and right channels associated with the first image stream, and the second audio stream includes left and right channels associated with the second image stream.

3. The method of claim 2, wherein the audio device is adapted to convert a single input stream that includes: (i) a left front channel, (ii) a right front channel, (iii) a left rear channel, and (iv) a right rear channel.

4. The method of claim 3, further comprising:
   mapping the left channel associated with the first image stream to the left front channel of the input stream;
   mapping the right channel associated with the first image stream to the right front channel of the input stream;
   mapping the left channel associated with the second image stream to the left rear channel of the input stream; and
   mapping the right channel associated with the second image stream to the right rear channel of the input stream.

5. The method of claim 4, further comprising:
   mapping a left front output from the audio device to a left output associated with the first image stream;
   mapping a right front output from the audio device to a right output associated with the first image stream;
   mapping a left rear output from the audio device to a left output associated with the second image stream; and
   mapping a right front output from the audio device to a right output associated with the second image stream.

6. The method of claim 5, further comprising:
   adjusting the second audio stream with respect to at least one of: (i) an equalization, (ii) a sample rate conversion, or (iii) an amplification.

7. The method of claim 5, further comprising:
   modulating the second image stream and the left and right outputs associated with the second image stream to generate a television signal.

8. The method of claim 3, wherein the audio device is an audio CODEC and said providing is performed via an AC-link.

9. The method of claim 3, wherein the single input stream provided to the audio device is associated with at least one of: (i) 5.1 audio information, (ii) DIGITAL DOLBY® audio information, or (iii) surround-sound audio information.

10. The method of claim 1, wherein the third audio stream is associated with a Sony/Philips Digital Interface Format audio stream.

11. The method of claim 10, wherein said providing the first and second audio streams is facilitated by a first direct memory access engine and said providing the third audio stream is facilitated by a second direct memory access engine.

12. The method of claim 1, wherein said determining the first audio stream includes:
    receiving a signal at a first tuner;
    providing a transport stream from the first turner to a first decoder; and
    decoding the transport stream to generate the first audio and image streams.

13. An apparatus, comprising:
    audio device to receive a single input stream having at least four channels and an additional digital input stream; and
    a controller adapted to provide a first audio stream and a second audio stream to the audio device as the single input stream and a third audio stream to the audio device as the additional digital input stream, wherein: (i) the first audio stream is associated with a first image stream and includes at least two channels, (ii) the second audio stream is associated with a second image stream and includes at least two channels, and (iii) the third audio stream is associated with the first image stream.

14. The apparatus of claim 13, further comprising:
    a first direct memory access engine to facilitate a transfer of the input stream to the audio device.

15. The apparatus of claim 14, wherein the audio device is an audio CODEC and the first direct memory access engine facilitates the transfer of the input stream to the audio CODEC via an AC-link.

16. The apparatus of claim 15, further comprising:
    a second direct memory access engine to facilitate a transfer of the third audio stream associated with the first image stream to the audio CODEC as a digital input stream.

17. An apparatus comprising:
    a storage medium having stored thereon instructions that when executed by a machine result in the following:
    receiving a first audio stream associated with a first image stream, the first audio stream having at least a left channel and a right channel,
    receiving a second audio stream associated with a second image stream, the second audio stream having at least a left channel and a right channel, providing the first and second audio streams to an audio CODEC as a single input stream, the audio CODEC being adapted to receive a single audio input stream having six channels; and providing a third audio stream associated with the first image stream to the audio CODEC as an additional digital input stream.

18. The apparatus of claim 17, wherein execution of the instructions further results in, prior to said providing:

adjusting the second audio stream.

19. The apparatus of claim 17, wherein the apparatus is associated with at least one of: (i) a personal computer, (ii) a media player, (iii) a digital video recorder, (iv) a game system, or (v) a set-top box.

20. A system, comprising:

an audio device adapted to receive a single input stream with at least four channels and an additional digital input stream;

a controller adapted to provide a first audio stream and the second audio stream to the audio device as the single input stream and a third audio stream to the audio device as the additional digital input stream, wherein: (i) the first audio stream is associated with a first image stream and includes at least two channels, (ii) the second audio stream is associated with a second image stream and includes at least two channels, and (iii) the third audio stream is associated with the first image stream; and a modulator to receive information associated with the second image stream and two channels output from the audio device.

21. The system of claim 20, wherein a left rear output from the audio device is mapped to a left output provided to the modulator and a right rear output from the audio device is mapped to a right output provided to the modulator.

22. The system of claim 21, wherein the audio device is an audio CODEC adapted to process at least one of: (i) 5.1 audio information, (ii) DIGITAL DOLBY® audio information, or (iii) surround-sound audio information.

* * * * *